United States Patent [19]

Mäusezahl et al.

[11] Patent Number: 4,990,599
[45] Date of Patent: Feb. 5, 1991

[54] 2,7-DIPHENYLAZO-1-AMINO-8-HYDROXYNAPHTHALENE DISAZO DYES CONTAINING TWO FIBER-REACTIVE GROUPS

[75] Inventors: Dieter Mäusezahl, Biel-Benken; Peter Loew, Münchenstein, both of Switzerland

[73] Assignee: Ciba-Geigy Corporation, Ardsley, N.Y.

[21] Appl. No.: 453,643

[22] Filed: Dec. 20, 1989

Related U.S. Application Data

[62] Division of Ser. No. 247,208, Sep. 21, 1988, Pat. No. 4,917,705.

[30] Foreign Application Priority Data

Sep. 21, 1987 [CH] Switzerland .................... 3625/87

[51] Int. Cl.⁵ ................... C09B 62/01; D06P 1/38; D06P 3/10
[52] U.S. Cl. ................... 534/634; 534/617; 534/632; 534/637; 534/643
[58] Field of Search ............ 534/634, 637, 643, 632, 534/617

[56] References Cited

U.S. PATENT DOCUMENTS

| | | | |
|---|---|---|---|
| 3,222,354 | 12/1965 | Lange | 534/643 |
| 3,663,526 | 5/1972 | Oesterlein et al. | 534/634 X |
| 3,692,463 | 9/1972 | Back et al. | 534/643 X |
| 3,910,758 | 10/1975 | Bien et al. | 534/632 X |
| 3,923,778 | 12/1975 | de Montmollin et al. | 534/643 |
| 4,425,270 | 1/1984 | Yamada et al. | 534/637 |
| 4,560,388 | 12/1985 | Rohrer | 534/643 X |
| 4,638,054 | 1/1987 | Herd et al. | 534/637 |
| 4,647,286 | 3/1987 | Seitz | 534/637 X |

FOREIGN PATENT DOCUMENTS

| | | | |
|---|---|---|---|
| 0099822 | 1/1965 | Denmark | 534/634 |
| 0112797 | 7/1984 | European Pat. Off. | 534/643 |
| 0131543 | 1/1985 | European Pat. Off. | 534/634 |
| 0131545 | 1/1985 | European Pat. Off. | 534/617 |

*Primary Examiner*—Floyd D. Higel
*Attorney, Agent, or Firm*—George R. Dohmann

[57] ABSTRACT

The invention relates to a process for dyeing or printing natural or synthetic polyamide fibre materials which comprises dyeing or printing these fibre materials with reactive dyes of the formula

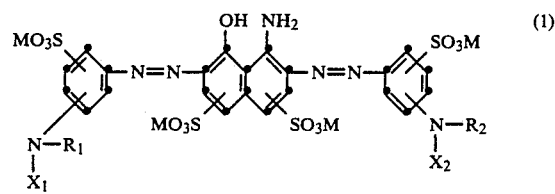

where each M is a cation, $R_1$ and $R_2$ are independently of each other hydrogen or $C_1$–$C_4$ alkyl, and $X_1$ and $X_2$ are independently of each other $\alpha,\beta$-dibromopropionyl, $\alpha$-bromoacryloyl, chloroacetyl or a mono-, di- or trihalopyrimidinyl radical.

5 Claims, No Drawings

2,7-DIPHENYLAZO-1-AMINO-8-HYDROX- YNAPHTHALENE DISAZO DYES CONTAINING TWO FIBER-REACTIVE GROUPS

This is a divisional of application Ser. No. 247,208 filed on Sept. 21, 1988, now U.S. Pat. No. 4,917,795.

The present invention relates to a novel process for dyeing or printing natural or synthetic polyamide fibre materials with sulfo-containing reactive dyes.

Reactive dyes have long been widely used for the dyeing or printing of textiles made of fibre materials. In the light of increasing demands on reactive dyeings in respect of economy, application properties and fastess level, the present state of the art is frequently not really satisfactory.

The present invention accordingly provides a process for dyeing or printing natural or synthetic polyamide fibre materials with sulfo-containing reactive dyes, which comprises dyeing or printing these fibre materials with reactive dyes of the formula $$\text{MO}_3\text{S} \underset{\underset{\underset{X_1}{|}}{N-R_1}}{\diagdown} -N=N- \underset{\text{MO}_3\text{S}}{\overset{\text{OH NH}_2}{\diagdown}} -N=N- \underset{\underset{\underset{X_2}{|}}{N-R_2}}{\diagdown} \text{SO}_3\text{M} \quad (1)$$

(1)

where each M is a cation, R1 and R2 are independently of each other hydrogen or C1–C4alkyl and X1 and X2 are independently of each other α,β-dibromopropionyl, α-bromoacryloyl, chloroacetyl or a mono-, di- or trihalopyrimidinyl radical. Suitable dyes for the process according to the invention also include mixtures of the dyes of the formula (1). The process according to the invention surprisingly produces dyeings which are level in the fibre and crisply outline prints, which are notable for the high fastness standard, in particular good degrees of exhaustion and fixation even in the case of deep shades, and also for good light fastness in deep shades.

The amounts in which the defined reactive dyes are used in the dyebaths or print pastes can vary within wide limits, depending on the desired depth of shade; in general, amounts of 0.01 to 10 per cent by weight, in particular 2 to 10 per cent by weight, based on the weight of fibre or the print paste, have proved advantageous.

In the defined reactive dyes of the formula (1), the cation M is for example hydrogen, an alkali metal cation, for example a lithium, potassium or preferably sodium cation, or ammonium, or M is the radical of an organic amine, for example the radical of triethanolamine, and R1 and R2 in the meaning of C1–C4alkyl are independently of each other, methyl, ethyl, propyl, isopropyl, n-butyl, sec-butyl, isobutyl or tertbutyl. Preferably R1 and R2 are identical. In particular, R1 and and R2 are hydrogen.

Examples of mono-, di- or trihalopyrimidinyl radicals are: 2,4-dichloro- pyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinylor -5-sulfo- or -5-mono-, -di- or -trichloromethyl- or -5-methylsulfonyl- pyrimidin-6-yl, 2,5-dichloro-4-methylsulfonylpyrimidin-6-, 2-fluoro- pyrimidin-4-yl, 2,6-difluoro-4-pyrimidinyl, 2,6-difluoro-5-chloro-4pyrimidinyl, 2-fluoro-5,6-dichloro-4-pyrimidinyl, 2,6-difluoro-5-methyl4-pyrimidinyl, 2,5-difluoro-6-methyl-4-pyrimidinyl, 2-fluoro-5-methyl≠-chloro-4-pyrimidinyl, 2-fluoro-5-nitro-6-chloro-4-pyrimidinyl, 5-bromo-2-fluoro-4-pyrimidinyl, 5-bromo-2-fluoro-4-pyrimidinyl, 2-fluoro-5-cyano-4-pyrimidinyi, 2-fluoro-5-methyl-4-pyrimidinyl, 2,5,6-trifluoro -4-pyrimidinyl, 5-chloro-6-chloromethyl-2-fluoro-4-pyrimidinyl, 2,6-difluoro-5-bromo-4-pyrimidinyl, 2-fluoro-5-bromo-6-chloromethyl-4pyrimidinyl, 2,6-difluoro-5-chloromethyl-4-pyrimidinyl, 2,6-difluoro-5-nitro -4-pyrimidinyl, 2-fluoro-6-methyl-4-pyrimidinyl, 2-fluoro-5-chloro- 5-methyl-4-pyrimidinyl, 2-fluoro-5-chloro-4-pyrimidinyl, 2-fluoro-6- chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluormethyl-4-pyrimidinyl, 2-fluoro-5-phenyl- or -5-methylsulfonyl 4-pyrimidinyl, -4-pyrimidinyl, 2-fluoro-5-carboxamido-4-pyrimidinyl, 2-fluoro-5-carbomethoxy-4-pyrimidinyl, 2-fluoro-5-bromo-6-trifluoro methyl-4-pyrimidinyl, 2-fluoro-6-carboxamido-4-pyrimidinyl, 2-fluoro-6-carbomethoxy -4-pyrimidinyl, 2-fluoro-6-phenyl-4-pyrimidinyl, 2-fluoro6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy4-pyrimidinyl, 2,6-difluoro-5-trifluoromethyl-4-pyrimidinyl; 2,4-bismethylsulfonylpyrimidin -4yl, 2,5-bis-methylsulfonyl-5-chloropyrimidin-4-yl, 2-methylsulfonylpyrimidin-4-yl, 2-phenylsulfonylpyrimidin-4-yl, 2-methylsulfonyl-5-chloro-6-methylpyrimidin-4-yl, 2-methylsulfonyl-5- bromo-6-methylpyrimidin-4-yl, 2-methylsulfonyl-5-chloro-6-ethylpyrimidin4 -yl, 2-methylsulfonyl-5-chloromethyl-pyrimidin-4-yl, 2-methylsulfonyl5 -nitro-6-methyl-pyrimidin-4-yl, 2,5,6-tris-methylsulfonylpyrimidin-4-yl, 2-methylsulfonyl-5,6-dimethylpyriaidin-4-yl, 2-ethylsulfonyl-5-chloro-6-methylpyrimidin-4-yl, 2-methylsulfonyl-6-chloropyrimidin-4-yl, 2,6- bis-methylsulfonyl-5-chloropyrimidin-4-yl, 2-methylsulfonyl-6-carboxypyrimidin-4-yl, 2-methylsulfonyl-5-sulfopyrimidin-4-yl, 2-methylsulfonyl6-carbomethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5- chloropyriaidin-4-yl, 2-sulfoethylsulfonyl-6-methylpyrimidin 4-yl, 2- methylsulfonyl-5-bromopyrimidin-4-yl, 2-phenylsulfonyl-5-chloropyrimidin4-yl, 2-carboxymethylsulfonyl-5-chloromethylpyrimidin-4-yl, 2,4-dichloro- pyrimidine-6-carbonyl or -6-sulfonyl, 2,4-dichloropyrimidine-5-carbonylor -5-sulfonyl, 2-chloro-4-methylpyrimidine-5-carbonyl, 2-methyl-4-chloropyrimidine- 5-carbonyl, 2-methylthio-4-fluoropyrimidine-5-carbonyl, 6-methyl-2,4-dichloropyrimidine-5-carbonyl, 2,4,6-trichloropyrimidine5-carbonyl, 2,4-dichloropyrimidine-5-sulfonyl, 2,4-dichloro-6-methyl- pyrimidine-5-carbonyl or -5-sulfonyl, 2-methylsulfonyl-6-chloropyrimidine- 4- and -5-carbonyl, 2,6-bis-(methylsulfonyl)-pyrimidine-4- or -5carbonyl, 2-ethylsulfonyl-6-chloropyrimidine-5-carbonyl, 2,4-bis-(methylsulfonyl)- pyrimidine-5-sulfonyl, 2-methylsulfonyl-4-chloro-6-methylpyrimidine-5-sulfonyl- or -5-carbonyl.

A preferred embodiment of the process according to the invention comprises using reactive dyes of the formula (1) where X1 and X2 are independently of each other α,β-dibromopropionyl, α-bromoacryloyl, chloroacetyl, 2,4-difluoro-5-chloropyrimidin-6-yl or 2,4,5-trichloropyrimidin-6-yl.

A particularly preferred embodiment of the process according to the invention comprises using reactive dyes of the formula (1) where X1 and X2 are independently of each other α,β-dibromopropionyl, α-bromoacryloyl, chloroacetyl or 2,4-difluoro-5-chloropyrimidin 6-yl.

A very particularly preferred embodiment of the process according to the invention comprises using reactive dyes of the formula

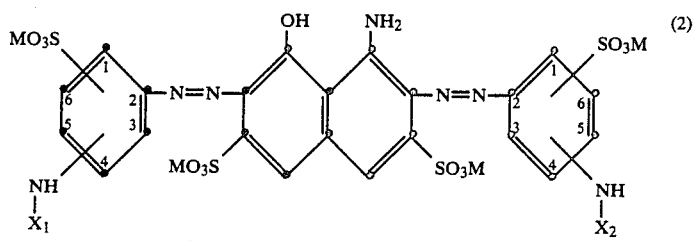

(2)

where M, X1 and X2 are as defined under the formula (1). More particularly, X1 and X2 have the preferred or particularly preferred meanings. In particular, the radical —SO3M is bonded to each of the two benzene rings in the 1-position in particular, the radical —NH—X1 and the radical —NH—X2 are bonded to the respective benzene ring in the 4-position.

A further particularly preferred embodiment of the process according to the invention comprises using reactive dyes of the formula (1), in particular those of formula (2) where X1 and X2 are identical.

A likewise very particularly preferred embodiment of the process according to the invention comprises using reactive dyes of the forcula (1), in particular of the formula (2), where Xand X2 are each α,β-dibromopropionyl or α-bromoacryloyl.

A likewise very particularly preferred embodiment of the process according to the invention comprises using reactive dyes of the formula (1), in particular of the formula (2), where X1 and X2 are each 2,4,5-tri- chloropyrimidin-6-yl or in particular 2,4-difluoro-5-chloropyrimidin-6-yl.

A very particularly important embodiment of the process according to the invention comprises using a reactive dye of the formula

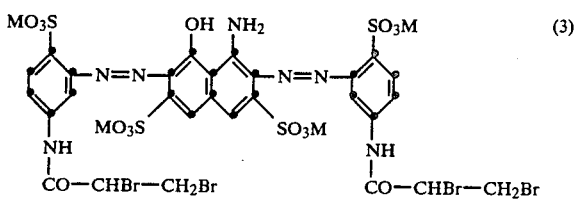

(3)

where M is as defined under the formula (1).

A likewise very particularly important embodiment of the process according to the invention comprises using a reactive dye of the formula

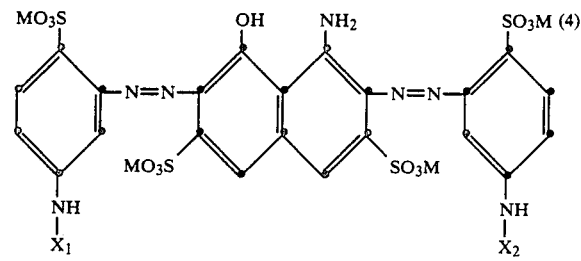

(4)

where M is as defined under the formula (1), one of the radicals X1 or X2 is α,β-dibromopropionyl or 2,4,5-trichloropyrimidin-6-yl and the other radical X2 or X1 is 2,4-difluoro-5-chloropyrimidin-6-yl or 2,4,5-trichloropyrimidin-6-yl. In particular, in the foraula (4) one of the radicals X1 or X2 is α,β-dibromopropionyl and the other radical X2 or X1 is 2,4-difluoro-5-chloropyrimidin-6-yl.

A further particularly important embodiment of the process according to the invention comprises using a reactive dye of the formula (4) where M is as defined under the formula (1) and X1 and X2 are 24-difluoro-5-chloropyrimidin-6-yl.

The textile fibre material made of natural polyamides which is dyeable or printable according to the invention comprises in particular wool, but also mixtures of wool/polyamide, wool/polyester, wool/cellulose or wool/polyacrylonitrile and also silk. In the process the fibre material can be present in a wide range of forms, for example as loose material, tops, yarn and piecegoods or as carpet.

The fibre material made of synthetic polyamides which is dyeable or printable according to the invention comprises that made of any known synthetic polyamide suitable for the purpose. In the process the fibre material is present in a wide range of forms, for example as loose material, tops, staple or filament yarn and piecegoods or as carpet.

In the process according to the invention preference is given to using fibre material made of natural polyaoides, in particular wool.

Special apparatus is not required in the process according to the invention. It is possible to use customary dyeing and printing equipment and machines, for example for loose material, tops, hanks, packages, piecegoods and carpets.

The dyebaths, in addition to the reactive dye, may also contain assistants.

The assistants usable in the process according to the invention are known per se and prepared by known methods. They preferably comprise levelling assistants or mixtures of these levelling assistants, comprising anion-active agents, cation-active agents, nonionic agents and amphoteric agents or mixtures thereof.

Anion-active agents are for example: substituted naphthalenesulfonic acids, sulfuric monoesters of ethoxylation products, salts of long-chain alkanesulfonic acids, salts of alkylarylsulfonic acids, in particular dodecylbenzenesulfonic acids, fatty acid aaide sulfonic acids, sulfuric monoesters of fatty amine polyglycol ethers. Cation-active agents are for example: polyglycol ethers of fatty amines, polyglycol ethers of fatty acid amide-amines, quaternary ammonium compounds. Nonionic agents are for example: polyglycol ethers of alkylphenols, of resin acids, of fatty acid alkylol-amides. Amphoteric agents are for example: reaction products of ethoxylated fatty amines and hydroxyethanesulfonic acids, reaction products of phenol and styrene, polyethylene glycol difatty acid esters.

Preference is given to using levelling assistants containing compounds of the formula

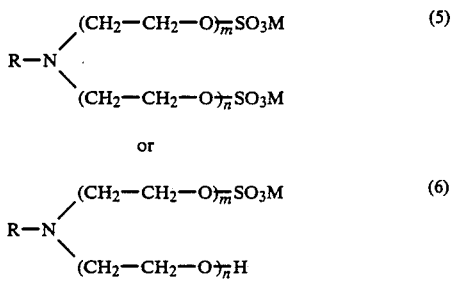

(5) or (6)
where R is alkyl or alkenyl having 12 to 22 carbon atoms, M is as defined under formula (1) and m and n are whole numbers, the sum of m and n being 2 to 14, or of the formula

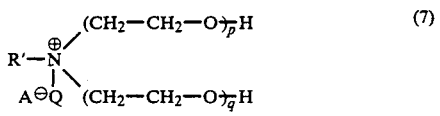

(7)
where R' is independently of R defined the same way as R, A is an anion, Q is an unsubstituted or substituted alkyl radical and p and q are whole numbers, the sum of p and q being 2 to 50, or of the formula

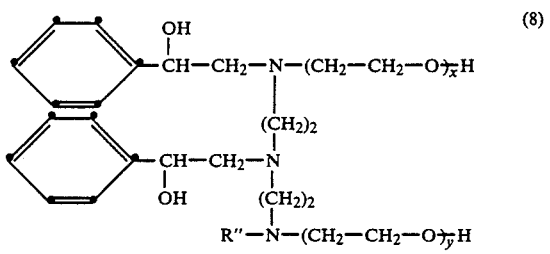

(8) where R'' is independently of R defined in the same way as R, and x and y are whole numbers, the sum of x and y being 80 to 140, a mixture containing compounds of the formula (6) and (7) or a mixture containing compounds of the formulae (6), (7) and (8) or a mixture containing compounds of the formulae (5), (7) and (8).

It is advantageous to use a compound of the formula (7) where A and Q are derived from the quaternizing agent chloroacetamide, ethylene chlorohydrin, ethylene bromohydrin, epichlorohydrin, epibromohydrin or dimethyl sulfate.

Preference is given to using a levelling assistant mixture containing the compounds of the formulae (6) and (7) where the sum of the symbols P and q in the formula (7) is 4 to 10.

Very particular preference is given to using in the process according to the invention a levelling assistant mixture containing the compound of the formula (6) in which R is a C16–C18alkyl radical and $m + n = 7$ or 8 and the compound of the formula (7) where R' is a C20–C22alkyl radical, A and Q are derived from the quaternizing agent chloroacetamide, and $p + q = 7$ to 8.

In particular, the very particularly preferred levelling assistant mixture contains 20 to 30 parts by weight of the compound of the formula (6) and 20 to 30 parts by weight of the compound of the foroula (7) where $p + q = 7$ or 8, based on 100 parts of the levelling assistant mixture.

The amount in which the levelling assistant or the levelling assistant mixture is used in the dyebaths can vary within wide limits; in general an amount of 0.3 to 3 per cent by weight, preferably 1 to 2 per cent by weight based on the fibre material, of levelling assistant or levelling assistant mixture have proved advantageous.

The dyebaths may contain as further assistants mineral acids, such as sulfuric acid, sulfamic acid or phosphoric acid, organic acids, advantageously lower, aliphatic carboxylic acids, such as formic, acetic or maleic acid. The acids serve in particular to set the pH of the liquors used according to the invention.

Preferably the pH of 3 to 6 is set with an organic acid, in particular formic acid or acetic acid.

Preference is given to dyeing at a pH of 4 to 6, in particular4.2 to 5.3.

Furthermore, the dye liquor may contain various salts, in particular ammonium or alkali metal salts, for example ammonium sulfate or sodium sulfate, as assistants. Preference is given to using 1 to 10 per cent by weight of ammonium or alkali metal salts, based on the fibre material.

The dyebaths may additionally contain further additives, for example wool-protecting, wetting and defoaming agents.

The liquor ratio can be selected within a wide range, from 6:1 to 80:1, preferably 10:1 to 50:1.

Dyeing takes place from an aqueous liquor by the exhaust method, for example at temperatures between 80 and 105° C. or 110° C., if a formaldehydedetaching wool-protecting agent is used, preferably between 98 and 103° C.

The dyeing time is in general 30 to 120 minutes.

A preferred embodiment of a process according to the invention comprises dyeing wool by the exhaust method.

A particularly preferred embodiment of the process according to the invention comprises, after dyeing at preferably 98 to 103° C., allowing the dyeing liquor to cool to about 75 to 90° C. and setting the pH to 8 to 9, preferably to about 8.5. The setting of the pH can be effected with customary agents, for example alkali metal hydroxides, alkali metal carbonates, alkali metal hydrogencarbonates and also in particular with aqueous ammonia solution of customary concentration, for example 25 per cent by weight of ammonia, or hexamethylenetetramine.

A very particularly preferred embodiment of the process according to the invention comprises adding the assistant mixture containing the compounds of the formulae (6) and (7) into the aqueous liquor and applying it at the same time to the dye. It is also possible first to treat the textile material with the assistant mixture and to dye in the same bath after addition of the reactive dye. Preferably the fibre material, in particular wool, is introduced into a liquor containing acid, ammonium sulfate and the assistant mixture and having a temperature of 30 to 70° C. Thereafter the reactive dye of the formula (1), in particular of the formula (2), (3) or (4), is added and the temperature of the dyebath is raised at a heating-up rate of 0.5 to 3° C. per minute with or without a temperature stop during the heating up, in order to dye within the stated temperature range of 98 to 103° C. At the end the bath is cooled down to about 75 to 90° C., which, after addition of a sufficient amount of aqueous ammonia solution to adjust the pH to about 8.5, is followed by a treatment of 10 to 20 minutes. The bath is then cooled down and the dyed material is as usual rinsed and dried.

After the dyeing has ended, the dyebaths are almost completely exhausted.

The reactive dyes used in the process according to the invention are partly known. The novel reactive dyes of the formula (1) form a further part of the subject-matter of the present invention.

Novel dyes are those of the formula (1) where M, R1 and R2 are as defined under the formula (1) and one of the radicals X1 or X2 is mono-, di- or trihalopyrimidinyl or chloroacetyl and the other radical X2 or X1 is mono-, di- or trihalopyrimidinyl, chloroacetyl, α,β-dibromopropionyl or α-bromoacryloyl.

Preference is given to the novel reactive dyes of the formula (1) where one of the radicals X1 or X2 is 2,4,5-trichloropyrimidin-6-yl, 2,4- difluoro-5-chloropyrimidin-6-yl or chloroacetyl and the other radical X2 or X1 is 2,4,5-trichloropyrimidin-6-yl, 2,4-difluoro-5-chloropyrimidin- 6-yl, α,β-dibromopropionyl, α-bromoacryloyl or chloroacetyl.

Particular preference is given to the novel reactive dyes of the formula (1) where M, R1 and R2 are as defined under the formula (1) and one of the radicals X1 or X2 is 2,4-difluoro-5-chloropyrimidin-6-yl or chloroacetyl and the other radical X2 or X1 is α,β-dibromopropionyl, α-bromoacryloyl, chloroacetyl or 2,4-difluoro-5-chloropyrimidin-6-yl.

Very particular preference is given to the novel reactive dyes of the formula (1) where R1 and R2 are hydrogen and X1 and X2 are identical.

Of particular interest are reactive dyes of the formula

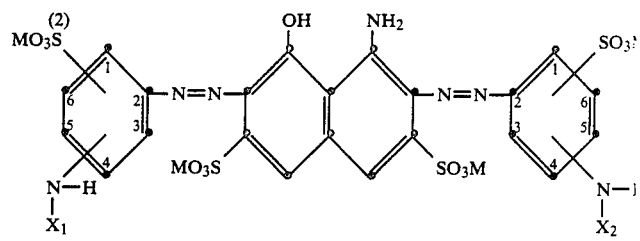

where X1 and X2 are each 2,4,5-trichloropyrimidin-6-yl or in Particular 2,4-difluoro-5-chloropyrimidin-6-yl and M is as defined under formula (1). In particular, the radical SO3M is bonded to each of the two benzene rings in the 1-position. In particular, the radicals —NH—X1 and —NH—X2 are bonded to the respective benzene rings in the 4-position.

Of very particular interest is the reactive dye of the formula

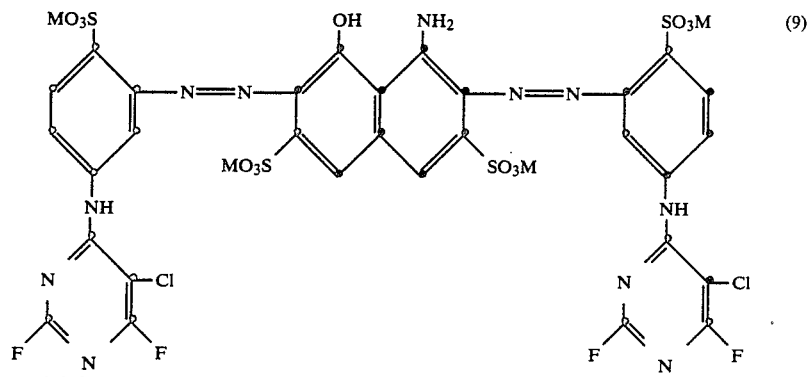

(9) where M is as defined under the formula (1). Likewise of very particular interest is the reactive dye of the formula (4), in particular the reactive dye of the formula (4) where X1 is α,β-dibromopropionyl and X2 is 2,4-difluoro-5-chloropyrimidin-6-yl.

The novel reactive dyes of the formula (1) are prepared by condensing for example a disazo dye of the formula

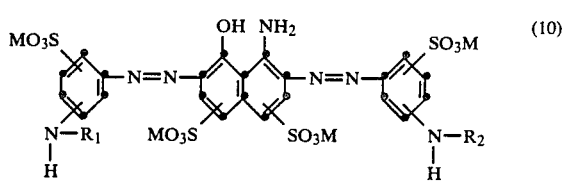

where M, R1 and R2 are as defined under the formula (1), with a compound introducing the radical X1 and a compound introducing the radical X2.

A further embodiment for preparing the novel compounds of the formula (1) comprises condensing a phenylenediamine of the formula

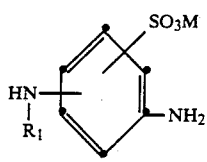

(11)

where M and R1 are as defined under the formula (1) with a compound introducing the radical X1, diazotizing the condensation product and coupling onto a compound of the formula

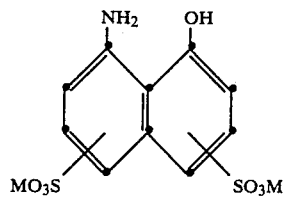

(12)

where M is as defined under the formula (1), and coupling onto the monoazo dye formed a diazotized diazo component of an amine of the formula

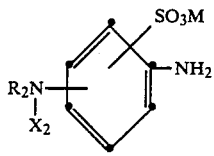

(13)

where M, R2 and X2 are as defined under the formula (1).

Amines of the formula (11) are for example: 1,3-phenylenediamine-4-sulfonic acid and 1,4-phenylenediamine-2-sulfonic acid.

Coupling components of the formula (12) are for example: 1-amino-8-hydroxynaphthalene- 3,6-disulfonic acid and 1-amino-8-hydroxynaphthalene- 4,6-disulfonic acid.

Amines of the formula (13) are for example: 1-amino-3-β-chloroacetyl- aminobenzene-4-sulfonic acid, 1-amino-3-(2',4'-difluoro-5-chloropyrimidin- 6-yl amino)-benzene-4-sulfonic acid, and 1-amino-3-(α,β-dibromopro- pionylamino)benzene-4-sulfonic acid.

Agents introducing the radical X1 or X2 are for example: 2,4,6-tri- fluoro-5-chloropyrimidine, chloroacetyl chloride, α,β-dibromopropionyl chloride, 2,4,5,6-tetrachloropyrimidine and also the aforementioned mono-, di- or trihalopyrimidinyl radicals which contain a further halogen atom.

The known compounds of the formula (1) are prepared by methods known per se.

In some cases the synthesis of the dyes of the formula (1) or the condensation product of the compound of the formula (11) with the compound introducing the radical X1 or with the compound of the formula (13) may be followed by a conversion reaction comprising for example treating an α,β-dibromopropionylamino radical with hydrogen halide abstractor agents, for example sodium hydroxide, thereby converting the α,β-dibromopropionyl group into an α-bromoacryloyl group.

The diazotization of the amines of the formulae (11) and (13) is effected by methods known per se, for example by the action of nitrous acid in aqueous mineral acid solution at low temperature; the coupling onto the coupling component of the formula (12) takes place once at a strongly acid and once at a weakly acid to alkaline pH.

The condensation of the compounds introducing the radicals X1 and X2 with the chromophore is preferably effected in an aqueous solution or suspension, at low temperatures and at weakly acid, neutral or weakly alkaline pH. Advantageously, the hydrogen halide freed in the course of the condensation is continuously neutralized by the addition of aqueous alkali metal hydroxides, carbonates or bicarbonates.

The novel azo dyes of the formula (1) are suitable by methods known per se for dyeing and printing, in particular nitrogen-containing or hyd- roxyl-containing fibre materials, for example textile fibre materials made of cellulose, silk and in particular wool and synthetic polyamides. The results obtained are level dyeings in black shades having good allround fastness properties, in particular good rub, wet, wet rub and light fastness.

In the examples below, parts are by weight. The temperatures are degrees Celsius. The relationship between parts by weight and parts by volume is the same as that between the gram and cubic centimetre.

EXAMPLE 1

10 parts of worsted yarn are pretreated in a dyebath containing per 400 parts of softened water at 50° 0.3 part of 80% acetic acid, 0.4 part of ammonium sulfate and 0.2 part of an assistant mixture consisting of 24 parts of the anionic compounds of the formula

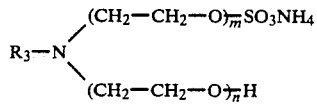

$R_3$ =C16–C18 hydrocarbon radical; m +n =7; 24 parts of the quaternary compound of the formula

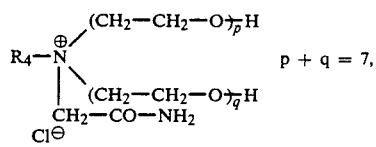

$R_4$ =C20-22 hydrocarbon radical; 5 parts of ammoniua chloride, 3 parts of oxalic acid, 44 parts of water, based on 100 parts of the assistant mixture, at 50° C. for 15 minutes during which the dyeing liquor is kept in constant agitation.

0.4 part is then added of the dye of the foraula

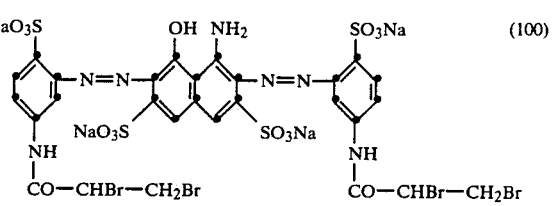

(100)

in the form of an aqueous solution. The pH of the dyebath is 4.5 to 5. The bath temperature is then raised to the boil at 0.5 to 1° per minute and maintained at 98 to 100° for 60 to 90 minutes. The almost completely exhausted dyebath is then cooled down to 80 to 85° and brought to a pH of 8 to 9 with about 0.5 part of a 25% aqueous ammonia solution. The dyed material is maintained at 80 to 85° and pH 8 to 9 for 10 to 15 minutes and then as usual rinsed and dried.

The result obtained is a worsted yarn dyed a bluish black shade having good allround fastness properties.

METHOD OF PREPARING THE REACTIVE DYE OF THE FORMULA 100 (USED IN EXAMPLE 1)

43.1 parts of the amino-containing chromophore of the formula

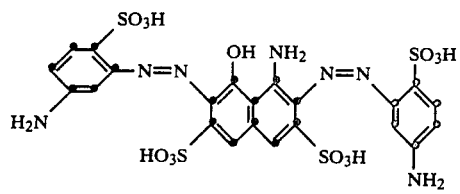

are dissolved in 550 parts of water under neutral conditions, and the solution is cooled down to 10°. At that temperature 33.0 parts of 2,3-dibromopropionyl chloride are added dropwise in the course of 30 minutes during which the pH of the reaction mixture is maintained at 6.5 to 7.0 by the simultaneous addition of 2 N sodium hydroxide solution. After the reaction has ended, the reaction mixture is clarified and the reactive dye formed is salted out at pH 6.5 by sprinkling in sodium chloride, filtered off, washed and dried in vacuo.

EXAMPLE 2

Example 1 is repeated, except that the dye of the formula 100) is replaced by the same amount of the dye of the formula

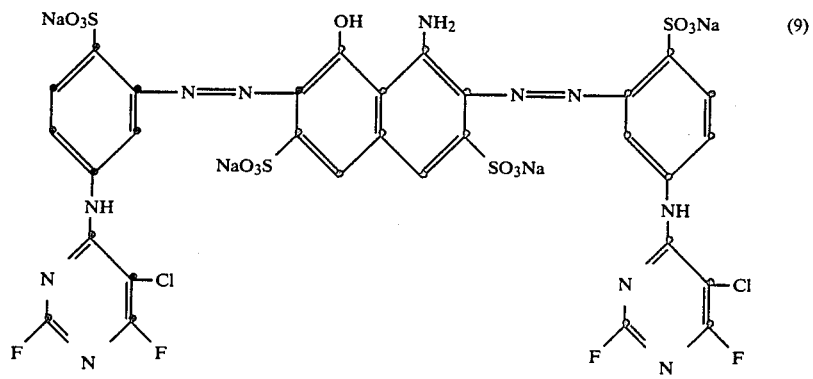

(9)

or of the formula

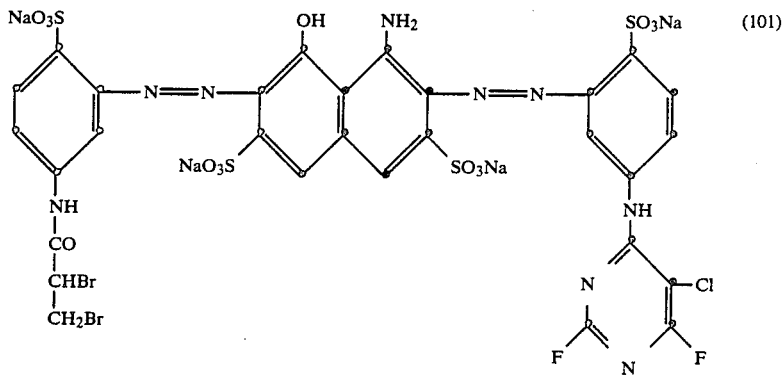

(101)

Again a bluish black dyeing on the worsted yarn having good allround fastness properties is obtained.

METHOD OF PREPARING THE REACTIVE DYE OF THE FORMULA (9) USED IN EXAMPLE 2

37.6 parts of 1,3-diaminobenzene-4-sulfonic acid are suspended in 450 parts of water and neutralized with 20 parts of 30% NaOH solution. To this solution are added dropwise at a temperature of 20 to 25° 24 parts of 2,4,6-trifluoro-5-chloropyrimidine and the pH is maintained at 7 to 7.5 with sodium bicarbonate. The acylated reaction product precipitates, and the precipitation is completed by the addition of sodium chloride; the product is then filtered off. 155 parts are obtained of moist 3-amino-1-(2',4'-difluoro-5'-chloropyrimidin-6'-ylamino)benzene-4-sulfonic acid.

155 parts of the above-obtained moist product are suspended in 1800 parts of water and admixed with 180 parts of 30% α-naphthalenesulfonic acid solution. 45 parts of 4 N sodium nitrite solution are then added dropwise at 20 to 25°. The result is a pale yellow suspension of the diazonium salt. After 60 minutes' stirring at 25° a small excess of nitrite is destroyed with sulfamic acid.

The suspension of the above-prepared diazonium salt is entered with 28.6 parts of 1-amino-8-hydroxynaphthalene-3,6-disulfonic acid in powder form and the suspension is brought in the course of 12 hours to a pH of 4.5 by addition of sodium acetate. The disazo dye formed precipitates even during coupling. The precipitation is completed by adding sodium chloride, and the product is filtered off, washed with 10% NaCl solution and dried in vacuo. 115 parts are obtained of a black powder which contains sodium chloride. The dye of the formula (9) obtained gives a bluish black dyeing on wool having very good wet fastness properties.

METHOD OF PREPARING THE REACTIVE DYE OF THE FORMULA (101) USED IN EXAMPLE 2

0.1 mole of 1,3-diaminobenzene-4-sulfonic acid is acylated with 2,4,6- trifluoro-5-chloropyrimidine, isolated and diazotized, all three steps being carried out as in the preceding preparation example. The suspension of the diazonium salt is admixed with a suspension of 0.09 mole of 1-amino-8-hydroxynaphthalene-3,6-disulfonic acid in 200 parts of water. In the course of 6 hours the pH is brought from 0.5 to about 2 by addition of sodium acetate. A red dye foras, some of which has precipitated.

0.1 mole of 1,3-diaminobenzene-4-sulfonic acid is acylated with 0.1 mole of α,β-dibromopropionyl chloride, isolated and diazotized, all three steps being carried out as in the preceding preparation example. The suspension of the diazonium salt is brought to pH 2 with sodium acetate and is added to the suspension of the above-prepared red monoazo dye. In the course of 6 hours the suspension is brought to pH 4.5 by addition of sodium acetate. A bluish black dye forms, which is precipitated by addition of sodium chloride. The product is filtered off, washed with 10% NaCl solution and dried in vacuo. 119 parts are obtained of a black powder containing sodium chloride. The dye formed, which predominantly conforms to the formula (101), dyes wool in bluish black shades having very good wet fastness properties.

The procedure of Examples 1 and 2 is repeated, except that the dyes of the formulae (9), (100) and (101) are replaced by an equimolar amount of a dye of the formula

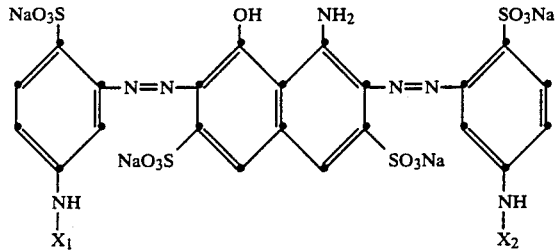

where X1 and X2 are as defined in columns 2 and 3 of the table below. Again bluish black dyeings having good fastness properties are obtained. Table

TABLE

| Example | X$_1$ | X$_2$ |
|---|---|---|
| 3 | —CO—CBr=CH$_2$ | —CO—CBr=CH$_2$ |
| 4 | —CO—CBr=CH$_2$ | —CO—CHBr—CH$_2$Br |
| 5 | —CO—CHBr—CH$_2$Br | —CO—CBr=CH$_2$ |
| 6 | —CO—CHBr—CH$_2$Br | 2,4-Difluoro-5-chloropyrimidin-6-yl |
| 7 | 2,4-Difluoro-5-chloropyrimidin-6-yl | —CO—CHBr—CH$_2$Br |
| 8 | 2,4-Difluoro-5-chloropyrimidin-6-yl | —CO—CBr=CH$_2$ |
| 9 | —CO—CBr=CH$_2$ | 2,4-Difluoro-5-chloropyrimidin-6-yl |
| 10 | 2,4,5-Trichloropyrimidin-6-yl | 2,4,5-Trichloropyrimidin-6-yl |
| 11 | —CO—CHBr—CH$_2$Br | 2,4,5-Trichloropyrimidin-6-yl |
| 12 | 2,4,5-Trichloropyrimidin-6-yl | —CO—CBr=CH$_2$ |
| 13 | 2,4,5-Trichloropyrimidin-6-yl | |

(continued)

| Example | X$_1$ | X$_2$ |
|---|---|---|
| | 6-yl | |

EXAMPLE 13

0.2 mole of 1,3-phenylenediamine-4-sulfonic acid is suspended in 200 ml of water, neutralized with 10 ml of 10 N sodium hydroxide solution and admixed with thorough stirring at 5 to 10° with 0.21 mole of α,β-dibromopropionyl chloride added dropwise. The pH is maintained at 6.5 to 7.5 by addition of 32 g of sodium bicarbonate. The acylated product precipitates, the precipitation is completed by addition of sodium chloride, and the product is filtered off. The moist residue contains 0.182 mole of the monoacylated compound of the formula

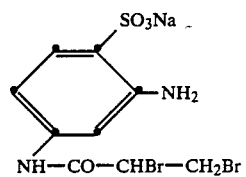

0.182 mole of this compound is suspended in 900 ml of water. 0.5 mole of 33% hydrochloric acid is then added, followed at a temperature of 10 to 15o by 0.2 mole of sodium nitrite in such a way that an excess is always present. After 60 minutes'subsequent stirring at 15 to 20° a small excess of sodium nitrite is destroyed with sulfamic acid. The suspension formed contains the diazonium salt of the formula

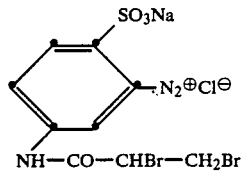

The suspension, which contains 0.182 mole of this diazonium salt, is admixed at pH 0.5 to 1 and at a temperature of 20 to 25° with 0.082 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula

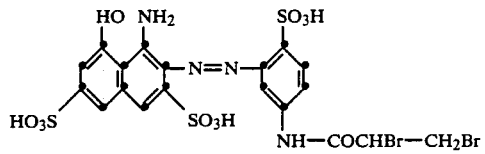

By addition of further sodium acetate the pH is raised to 4.0 in the course of 4 hours during which the disazo dye forms, some of which precipitates. KCl is added to complete the precipitation. The dye is filtered off, washed with 20% NaCl solution and dried at 70° in vacuo. 123 g are obtained of a dye of the formula (100), which on wool builds up to deep shades and has very good fastness properties.

EXAMPLE 14

0.2 mole of 1,3-phenylenediamine-4-sulfonic acid is suspended in 200 ml of water, neutralized with 20 ml of 10 N sodium hydroxide solution and admixed with thorough stirring at 5 to 10° with 0.21 mole of α,β- sodium bicarbonate are added to maintain the pH at from 6.5 to 7.5. The acylated product precipitates, the precipitation is completed by addition of sodium chloride, and the product is filtered off. The moist residue contains 0.182 mole of the monoacylated compound of the formula

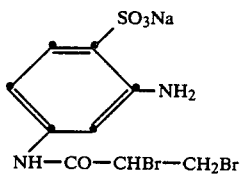

0.182 mole of this compound is suspended in 1800 ml of water and brought to pH 7 with sodium hydroxide. 0.2 mole of NaOH is added dropwise with cooling to 0° and a pH of 12 is maintained for 20 minutes. Acetic acid is then added to bring the pH to 8.5 and 0.2 mole of sodium nitrite is added. This mixture is poured onto a stirred mixture consisting of 1000 g of ice and 200 ml of 30% naphthalenesulfonic acid solution. A yellow solution forms of the diazonium salt of the formula

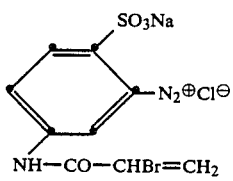

An excess of sodium nitrite is destroyed with sulfamic acid.

The solution, which contains 0.182 mole of the indicated diazonium salt, is admixed at a pH of 0.5 to 1 and at a temperature of 20 to 25° with 0.082 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula

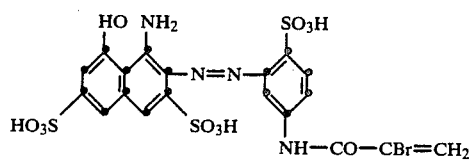

By addition of further sodium acetate the pH is raised to 4.0 in the course of 4 hours during which the disazo dye forms, some of which precipitates. The precipitation is completed by addition of NaCl. The dye is filtered off, washed with 20% NaCl solution and dried at 70° in vacuo. 125 g are obtained of dye of the formula

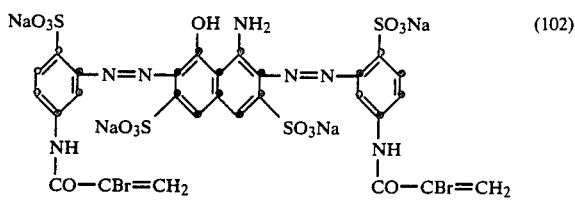

(102)

which on wool builds up to deep shades and has very good wet fastness properties.

EXAMPLE 15

0.1 mole of 1,3-phenylenediamine-4-sulfonic acid is suspended in 200 ml of water, neutralized with 10 ml of 10 N sodium hydroxide solution and admixed with thorough stirring at 5 to 10° with 0.105 mole of α,β-dibromopropionyl chloride added dropwise. The pH is maintained at 6.5 to 7.5 by addition of 16 g of sodium bicarbonate. The acylated product precipitates, the precipitation is treated by adding sodium chloride, and the product is filtered off. The moist residue contains 0.092 mole of the monoacylated compound of the formula

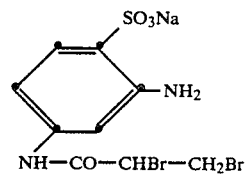

0.092 mole of this compound is suspended in 900 ml of water. 0.25 mole of 33% hydrochloric acid is then added, followed at a temperature of 10 to 15° by 0.1 mole of sodium nitrite in such a way that an excess is always present. After 60 minutes of subsequent stirring at 15 to 20° a small excess of sodium nitrite is destroyed with sulfamic acid. The resulting suspension contains the diazonium salt of the formula

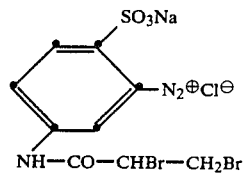

The suspension, which contains 0.092 mole of the indicated diazonium salt, is admixed at a pH of 0.5 to 1 and at a temperature of 20 to 25° to with 0.082 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula

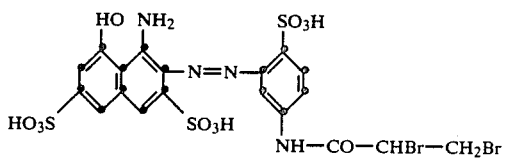

After the coupling has ended, 0.092 mole of the diazonium salt solution prepared according to Example 14 is added. By addition of further 1 acetate the pH is raised to 4.0 in the course of 4 hours during which the disazo dye forms, some of which precipitates. The precipitation is completed by the addition of KCl. The dye is filtered off, washed with 20% NaCl solution and dried at 70° in vacuo. 117 g are obtained of the dye of the formula

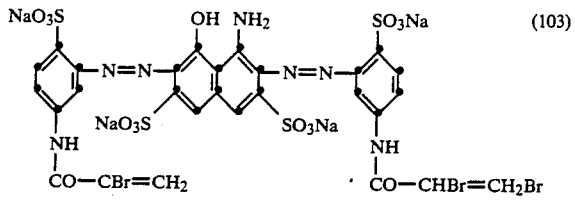 (103)

which on wool builds up deep shades and has very good wet fastness properties.

EXAMPLE 16

0.1 mole of 1,3-phenylenediamine-4-sulfonic acid is suspended in 200 ml of water, neutralized with 10 ml of 10 N sodium hydroxide solution and admixed with thorough stirring at 5 to 10° with 0.105 mole of α,β-dibromopropionyl chloride added dropwise. The pH is maintained at 6.5 to 7.5 by addition of 16 g of sodium bicarbonate. The acylated product precipitates, the precipitation is treated by adding sodium chloride, and the product is filtered off. The moist residue contains 0.092 mole of the monoacylated compound of the formula

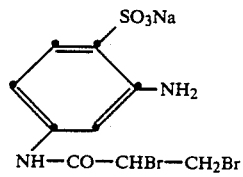

0.092 mole of this compound is suspended in 900 ml of water and brought to pH 7 with sodium hydroxide. 0.1 mole of NaOH is added dropwise with cooling to 0°, and a pH of 12 is maintained for 20 minutes. Thereafter a pH of 8.5 is set with acetic acid, and 0.1 mole of sodium nitrite is added. This mixture is poured onto a stirred mixture consisting of 500 g of ice and 100 ml of 30% naphthalenesulfonic acid solution. The result is a yellow solution of the diazonium salt of the formula

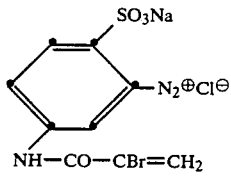

A sodium nitrite excess is destroyed with sulfamic acid.

The solution, which contains 0.092 mole of the indicated diazonium salt, is admixed at a pH of 0.5 to 1 and at a temperature of 20 to 25o with 0.082 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula

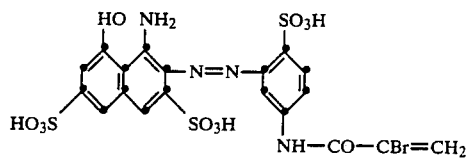

After the coupling has ended, 0.92 mole of the diazonium salt solution prepared according to Example 13 is added. By addition of further sodium acetate the pH is raised to 4.0 in the course of 4 hours during which the disazo dye forms, some of which precipitates. The precipitation is completed by addition of NaCl. The dye is filtered off, washed with 20% NaCl solution and dried at 70° in vacuo. 120 g are obtained of the dye of the formula

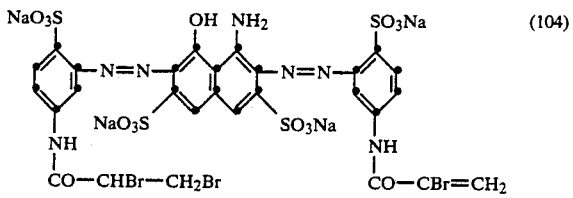 (104)

which on wool builds up to deep shades and has very good wet fastness properties.

EXAMPLE 17

0.1 mole of 1,3-phenylenediamine-4-sulfonic acid is suspended in 200 ml of water, neutralized with 10 ml of 10 N sodium hydroxide solution and admixed with thorough stirring at 5 to 10° with 0.105 mole of 2,4,6-trifluoro-5-chloropyrimidine added dropwise. By addition of 16 g of sodium bicarbonate the pH is maintained at 6.5 to 7.5. The acylated product precipitates, the precipitation is completed by addition of sodium chloride, and the product is filtered off. The moist residue contains 0.090 mole of the monoacylated compound of the formula

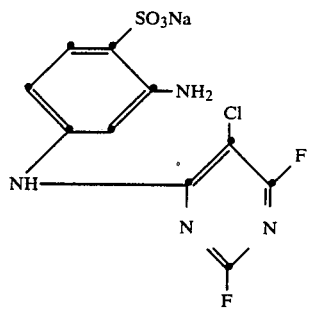

0.090 mole of the moist monoacylated product is diazotized as indicated in Example 2 for the dye of the formula (9).

The suspension, which contains 0.090 mole of the diazonium salt, is admixed at a pH of 0.5 to 1 and at a temperature of 20 to 25° with 0.081 mole of 1-amino-8-hydroxynapthalene-3,6disulfonic acid in powder form. By addition of sodium acetate the pH is brought to a value of 2.0 in the course of 4 hours. The coupling mixture predominantly contains the monoazo dye of the formula

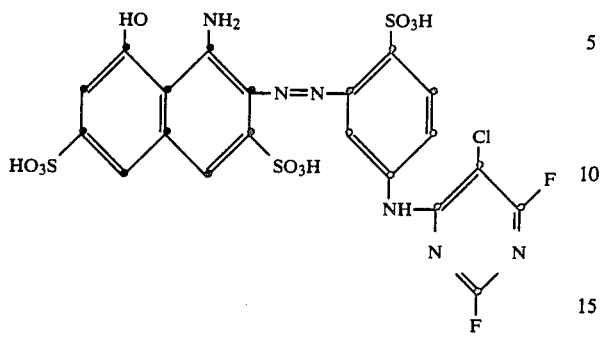

After the coupling has ended, 0.92 mole of the diazonium salt solution prepared according to Example 13 is added. By further addition of sodium acetate the pH is raised to 4.0 in the course of 4 hours, during which the disazo dye forms, some of which precipitates. The precipitation is completed by addition of NaCl. The dye is filtered off, washed with 20% NaCl solution and dried at 70° in vacuo. 123 g are obtained of the dye of the formula

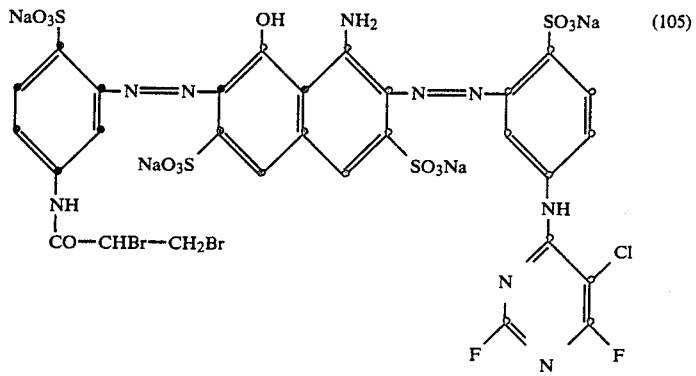

which on wool produces a bluish black dyeing having very good wet fastness properties.

EXAMPLE 18

0.1 mole of 1,3-phenylenediamine-4-sulfonic acid is suspended in 200 ml of water, neutralized with 10 ml of 10 N sodium hydroxide solution and admixed with thorough stirring at 5 to 10° with 0.105 mole of α,β-dibromopropionyl chloride added dropwise. By addition of 16 g of sodium bicarbonate the pH is maintained at 6.5 to 7.5. The acylated product precipitates, the precipitation is completed by addition of sodium chloride, and the product is filtered off. The moist residue contains 0.092 mole of the monoacylated compound of the formula

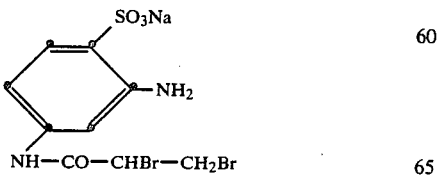

0.092 mole of this compound is suspended in 900 ml of water. 0.25 mole of 33% hydrochloric acid is then added, followed at a temperature of 10 to 15° by 0.1 mole of sodium nitrite in such a way that an excess is always present. After 60 minutes' subsequent stirring at 15 to 20° a small excess of sodium nitrite is destroyed with sulfamic acid. The suspension formed contains the diazonium salt of the formula

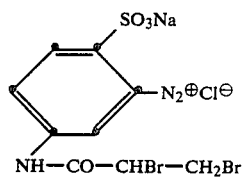

The suspension, which contains 0.092 mole of the indicated diazonium salt, is admixed at a pH of 0.5 to 1 and at a temperature of 20 to 25° with 0.082 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula (105)

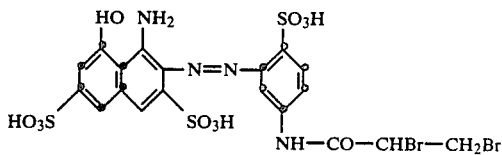

After the coupling has ended, 0.090 mole of the diazonium salt solution of the formula

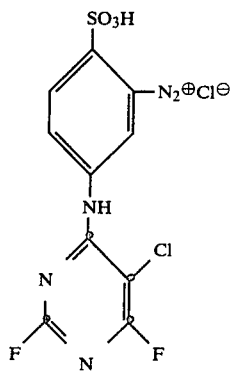

prepared according to Example 2 is added.

By addition of further sodium acetate, the pH is raised to 4.0 in the course of 4 hours, during which the disazo dye forms, some of which precipitates. The precipitation is completed by addition of KCl. The dye is filtered off, washed with 20% NaCl solution and dried at 70° in vacuo. 115 g are obtained of the dye of the formula naphthalenesulfonic acid solution The result is a yellow solution of the diazonium salt of the formula

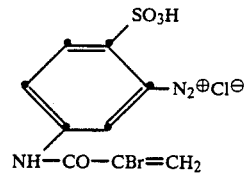

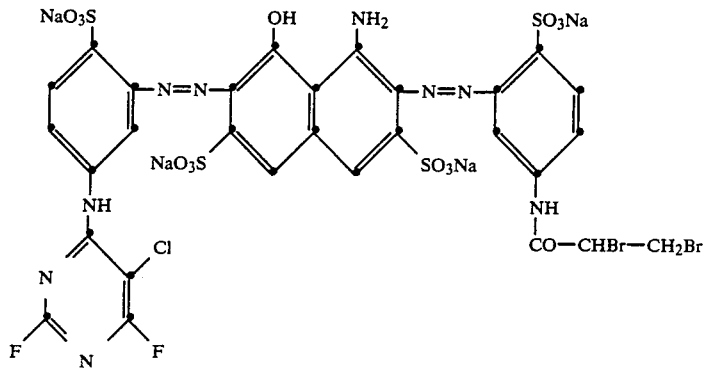

(106)

which produces a bluish black dyeing on wool having very good wet fastness properties.

EXAMPLE 19

0.1 mole of 1,3-phenylenediamine-4-sulfonic acid is suspended in 200 ml of water, neutralized with 10 ml of 10 N sodium hydroxide solution and admixed with thorough stirring at 5 to 10° with 0.105 mole of $\alpha,\beta$-dibromopropionyl chloride added dropwise. By addition of 16 g of sodium bicarbonate the pH is maintained at 6.5 to 7.5. The acylated product precipitates, the precipitation is completed by addition of sodium chloride, and the product is filtered off. The moist residue contains 0.092 mole of the monoacylated compound of the formula

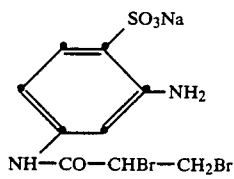

0.092 mole of this compound is suspended in 900 ml of water and brought to pH 7 with sodium hydroxide. 0.1 mole of NaOH is added dropwise with cooling at 0° and a pH of 12 is maintained for 20 minutes. The pH is then adjusted to 8.5 with acetic acid, and 0.1 mole of sodium nitrite is added. This mixture is poured onto a stirred mixture consisting of 500 g of ice and 100 ml of 30%

A sodium nitrite excess is destroyed with sulfamic acid.

The solution, which contains 0.092 mole of the indicated diazonium salt, is admixed at a pH of 0.5 to 1 and at a temperature of 20 to 25° with 0.081 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula

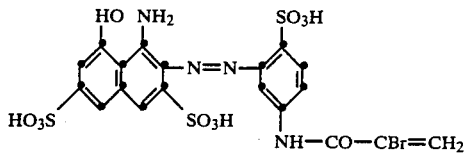

After the coupling has ended, 0.09 mole of the diazonium salt solution prepared according to Example 2 for the dye of the formula (9) is added. By addition of further sodium acetate the pH is raised to 4.0 in the course of 4 hours, during which the disazo dye forms, some of which precipitates. The precipitation is completed by addition of NaCl. The dye is filtered off, washed with 20% NaCl solution and dried at 70° in vacuo. 121 g are obtained of the dye of the formula

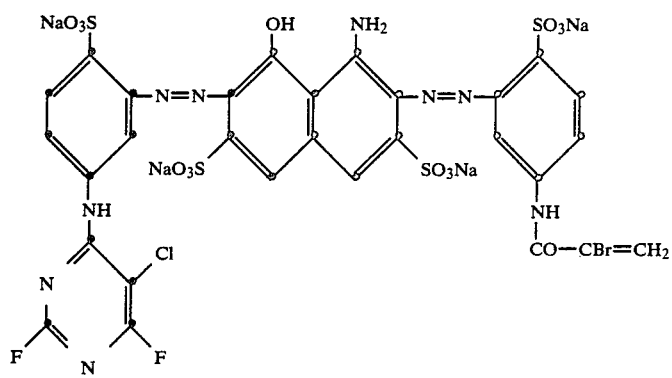

(107)

which produces a bluish black dyeing on wool having very good wet fastness properties.

EXAMPLE 20

0.1 mole of 1,3-phenylenediamine-4-sulfonic acid is suspended in 200 ml of water, neutralized with 10 ml of 10 N sodium hydroxide solution and admixed with thorough stirring at 5 to 10° with 0.105 mole of 2,4,6-trifluoro-5-chloropyrimidine added dropwise. By addition of 16 g of sodium bicarbonate the pH is maintained at 6.5 to 7.5. The acylated product precipitates, the precipitation is completed by addition of sodium chloride, and the product is filtered off. The moist residue contains 0.090 mole of the monoacylated compound of the formula

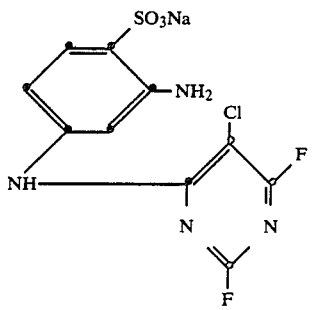

0.090 mole of the moist monoacylated product is diazotized as indicated in Example 2 for the dye of the formula (9).

The suspension, which contains 0.090 mole of the diazonium salt, is admixed at a pH of 0.5 to 1 and at a temperature of 20 to 25° with 0.081 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula

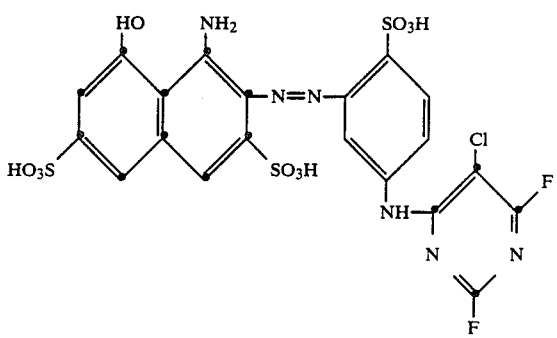

After the coupling has ended, 0.92 mole of the diazonium salt solution prepared according to Example 14 is added. By addition of further sodium acetate the pH is raised to a value of 4.0 in the course of 4 hours, during which the disazo dye forms, some of which precipitates. The precipitation is completed by addition of KCl and/or NaCl. The dye is filtered off, washed with 20% NaCl solution and dried at 70° in vacuo. 120 g are obtained of the dye of the foraula

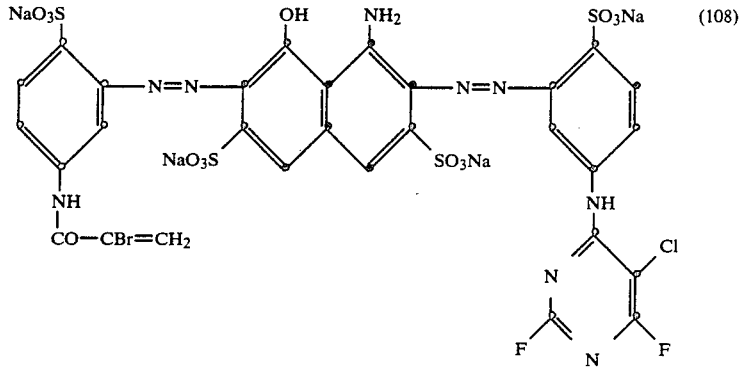

(108)

which produces a deep black dyeing on wool having very good wet fastness properties.

EXAMPLE 21

0.1 mole of 1,3-phenylenediamine-sulfonic acid is suspended in 200 ml of water, neutralized with 10 ml of 10 N sodium hydroxide solution and admixed with thorough stirring at 4° with 0.105 mole of 2,4,5,6-tetrachloropyrimidine in 30 ml of acetone added dropwise. By addition of 16 g of sodium bicarbonate the pH is maintained at 7.5 to 8.

The acylated product precipitates, the precipitation is completed by the addition of sodium chloride, and the product is filtered off. The moist residue contains 0.094 mole of the monoacylated compound of the formula

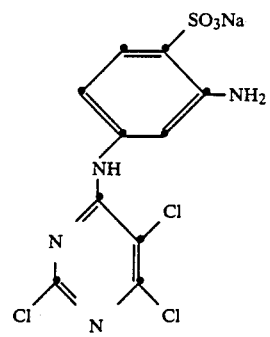

0.094 mole of this compound is suspended in 900 ml of water. 100 ml of 30% naphthalenesulfonic acid solution are then added, followed at a temperature of 20 to 25° by 0.1 mole of sodium nitrite in such a way that an excess is always present. After 60 minutes' subsequent stirring at 15 to 20° a small excess of sodium nitrite is destroyed with sulfamic acid. The suspension formed contains the diazonium salt of the formula

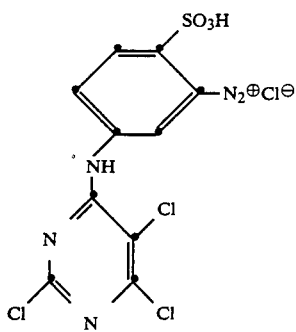

The suspension, which contains 0.094 mole of the diazonium salt, is admixed at a pH of 0.5 to 1 and at a temperature of 20 to 25° with 0.041 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula

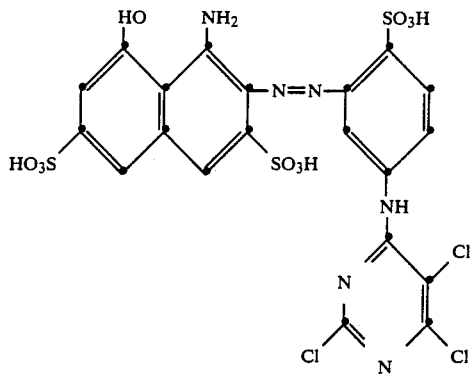

By the addition of further sodium acetate the pH is raised to a value of 4.0 in the course of 4 hours, during which the disazo dye forms, some of which precipitates. The precipitation is completed by addition of NaCl. The dye is filtered off, washed with 20% NaCl solution and dried at 70° in vacuo. 63 g are obtained of dye of the formula

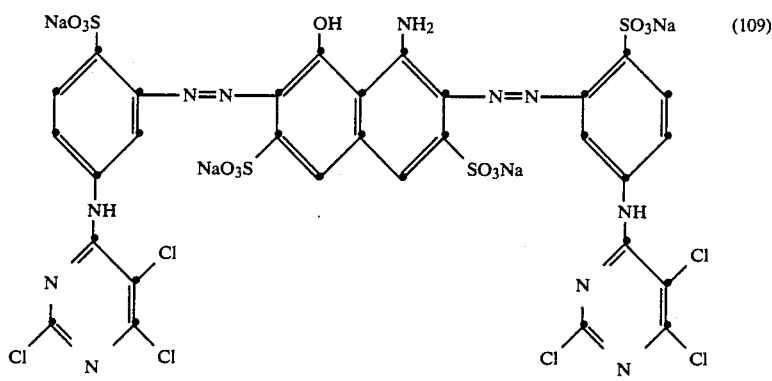

(109)
which on wool builds up to deep shades and has good wet fastness properties.

EXAMPLE 22

0.1 mole of 1,3-phenylenediamine-4-sulfonic acid is suspended in 200 ml of water, neutralized with 10 ml of 10 N sodium hydroxide solution and admixed with thorough stirring at 4o with 0.105 mole of 2,4,5,6-tetrachloropyrioidine in 30 ml of acetone added dropwise. By addition of 16 g of sodium bicarbonate the pH is maintained at 7.5 to 8. The acylated product precipitates, the precipitation is completed by the addition of sodium chloride, and the product is filtered off. The moist residue contains 0.094 mole of the monoacylated compound of the formula

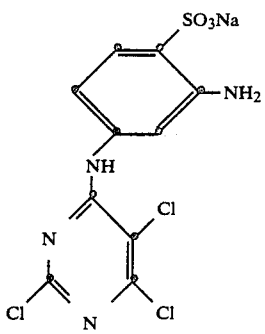

0.094 mole of this compound is suspended in 900 ml of water. 100 ml of 30% naphthalenesulfonic acid solution are then added, followed at a temperature of 20 to 25° by 0.1 mole of sodium nitrite in such a way that an excess is always present. After 60 minutes' subsequent stirring at 15 to 2020 a small excess of sodium nitrite is destroyed with sulfamic acid. The suspension formed contains the diazonium salt of the formula

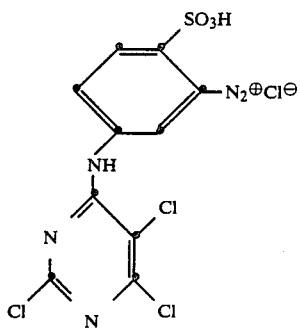

The suspension, which contains 0.094 mole of the diazonium salt, is admixed at a pH of 0.5 to 1 and at a temperature of 20 to 25° with 0.082 mole of 1-amino-8-hydroxynaphthalene 3,6-disulfonic acid in powder form. By addition of sodium acetate the pH is brought to a value of 2.0 in the course of 4 hours. The coupling mixture predominantly contains the monoazo dye of the formula

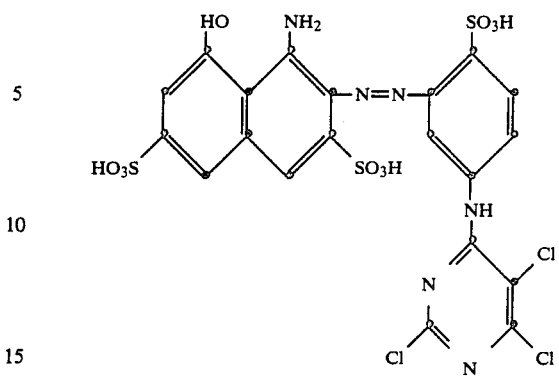

After the coupling has ended, 0.092 mole of the diazonium salt solution prepared according to Example 13 is added. By addition of further sodium acetate the pH is raised to a value of 4.0 in the course of 4 hours during which the disazo dye is formed, some of which precipitates. The precipitation is completed by addition of NaCl. The dye is filtered off, washed with 20% NaCl solution and dried at 70° in vacuo. 125 g are obtained of the dye of the formula

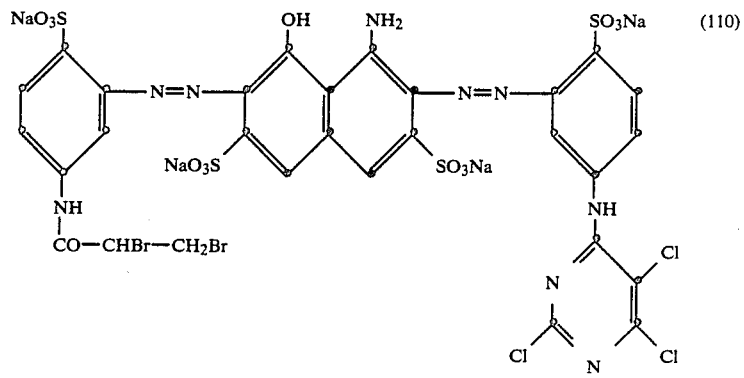

(110)
which on wool builds up to deep shades and has good wet fastness properties.

EXAMPLE 23

0.1 mole of 1,3-phenylenediamine-4-sulfonic acid is suspended in 200 ml of water, neutralized with 10 ml of 10 N sodium hydroxide solution and admixed with thorough stirring at 5 to 10° with 0.105 mole of α,β-dibromopropionyl chloride added dropwise. By addition of 16 g of sodium bicarbonate the pH is maintained at 6.5 to 7.5. The acylated product precipitates, the precipitation is completed by addition of sodium chloride, and the product is filtered off. The moist residue contains 0.092 mole of the monoacylated compound of the formula

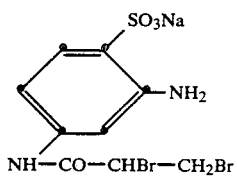

0.092 mole of this compound is suspended in 1800 ml of water and brought to pH 7 with sodium hydroxide. 0.1 mole of NaOH is added dropwise with cooling at 0° and a pH of 12 is maintained for 20 minutes. The pH is then adjusted to 8.5 with acetic acid, and 0.1 mole of sodium nitrite is added. This mixture is poured onto a stirred mixture consisting of 500 g of ice and 100 ml of 30% naphthalenesulfonic acid solution. The result is a yellow solution of the diazonium salt of the formula

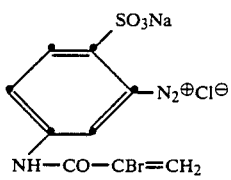

A sodium nitrite excess is destroyed with sulfamic acid.

The solution, which contains 0.092 mole of the indicated diazonium salt, is admixed at a pH of 0.5 to 1 and at a temperature of 20 to 25o with 0.081 mole of 1-amino-8-hydroxynaphthalene-3,6-disulfonic acid in powder form. By addition of sodium acetate the pH is brought to a value of 2.0 in the course of 4 hours. The coupling mixture predominantly contains the monoazo dye of the formula

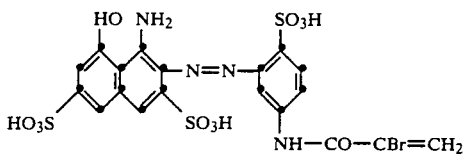

After the coupling has ended, 0.094 mole of the diazonium salt suspension prepared according to Example 21 is added. By addition of further sodium acetate the pH is raised to a value of 4.0 in the course of 4 hours during which the disazo dye is formed, some of which precipitates. The precipitation is completed by addition of NaCl. The dye is filtered off, washed with 20% NaCl solution and dried at 70° in vacuo. 117 g are obtained of the dye of the formula

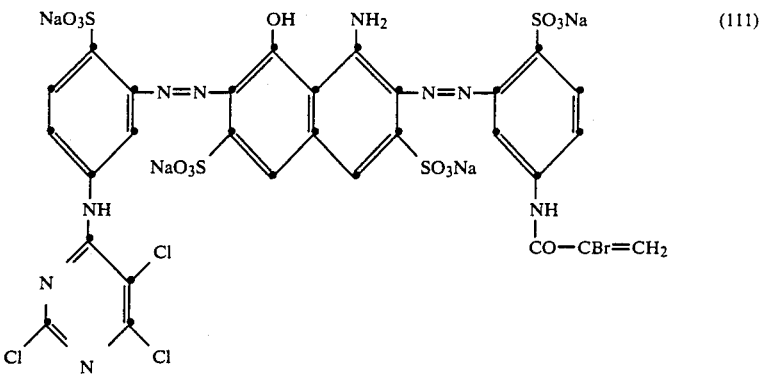

(111) which on wool builds up to deep shades and has very good wet fastness properties.

What is claimed is:

1. A reactive dye of the formula

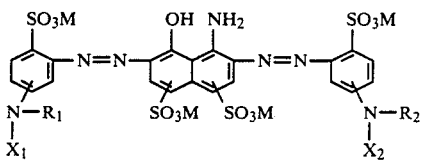

where each M is a cation, R1, and R2 are independently of each other hydrogen or C1-C4-alkyl and one of the radicals X1 or X2 is 2,4,5-trichloropyrimidin-6-yl or chloroacetyl and the other radical X1 or X2 is 2,4,5-trichloropyrimidin-6-yl, 2,4-difluoro-5-chloropyrimidin-6-yl, 2,3-dibromopropionyl, 2-bromoacryloyl or chloroacetyl.

2. A reactive dye according to claim 1, wherein one of the radicals X1 or X2 is chloracetyl and the other radical X2 or X1 is 2,3-dibromopropionyl, 2-bromoacryloyl, chloroacetyl or 2,4-difluoro-5-chloropyrimidin-6-yl.

3. A reactive dye according to claim 2, wherein R1 and R2 are hydrogen and x1 and X2 are identical.

4. A reactive dye according to claim 1, wherein one of the radicals X1 and X2 is 2,4,5-trichloropyrimidin-6-yl and the other radical X1 and X2 is a $\alpha,\beta$-dibromopropionyl.

5. A reactive dye according to claim 1, wherein X1 and X2 are 2,4,5-trichloropyrimidin-6-yl.

* * * * *